United States Patent
Huang et al.

(10) Patent No.: US 11,926,389 B2
(45) Date of Patent: Mar. 12, 2024

(54) TILTING VEHICLE AND A METHOD FOR ASSEMBLING THE SAME

(71) Applicant: KWANG YANG MOTOR CO., LTD., Kaohsiung (TW)

(72) Inventors: Cheng-Hung Huang, Kaohsiung (TW); Feng-Chih Tsai, Kaohsiung (TW)

(73) Assignee: Kwang Yang Motor Co., Ltd., Kaohsiung (TW)

(*) Notice: Subject to any disclaimer, the term of this patent is extended or adjusted under 35 U.S.C. 154(b) by 0 days.

(21) Appl. No.: 17/866,671

(22) Filed: Jul. 18, 2022

(65) Prior Publication Data

US 2023/0025109 A1 Jan. 26, 2023

(30) Foreign Application Priority Data

Jul. 20, 2021 (TW) ................................ 110126648

(51) Int. Cl.
*B62K 5/10* (2013.01)
*B62K 5/027* (2013.01)
*B62K 5/05* (2013.01)
*B62K 5/08* (2006.01)

(52) U.S. Cl.
CPC ............... *B62K 5/10* (2013.01); *B62K 5/027* (2013.01); *B62K 5/05* (2013.01); *B62K 5/08* (2013.01)

(58) Field of Classification Search
CPC ... B62K 5/10; B62K 5/05; B62K 5/08; B62K 5/027; B62D 9/02; B62D 7/16
USPC ......................................................... 180/210
See application file for complete search history.

(56) References Cited

U.S. PATENT DOCUMENTS

| | | | | |
|---|---|---|---|---|
| 9,919,758 | B2* | 3/2018 | Takano | B62K 5/05 |
| 10,583,885 | B2* | 3/2020 | Raffaelli | B62D 9/02 |
| 2018/0257729 | A1* | 9/2018 | Mitsuoka | B62K 25/08 |
| 2018/0257730 | A1* | 9/2018 | Mitsuoka | B62K 19/20 |
| 2019/0100268 | A1* | 4/2019 | Deguchi | B62K 5/08 |

FOREIGN PATENT DOCUMENTS

TW 202015957 A * 5/2020 ............. B62K 11/04

OTHER PUBLICATIONS

Toshio: TW 202015957 A, published May 2020, english translation retrieved Aug. 21, 2023 (Year: 2020).*

* cited by examiner

*Primary Examiner* — Paul N Dickson
*Assistant Examiner* — Caitlin Anne Miller
(74) *Attorney, Agent, or Firm* — Burris Law, PLLC (57) ABSTRACT

A tilting vehicle includes a frame unit, a tilting mechanism and two front wheels. The frame unit includes a head tube extending generally along an up-down direction, and a main frame detachably connected to the head tube. The tilting mechanism includes one crossbar pivotally connected to the head tube and extending along a left-right direction, and two connecting rods extending along the up-down direction, being opposite to each other along the left-right direction, and being pivotally connected to opposite ends of the one crossbar, respectively, such that the connecting rods are movable along the up-down direction relative to the head tube. The front wheels are rotatably mounted to the connecting rods, respectively.

6 Claims, 9 Drawing Sheets

TILTING VEHICLE AND A METHOD FOR ASSEMBLING THE SAME

CROSS-REFERENCE TO RELATED APPLICATION

This application claims priority of Taiwanese Patent Application No. 110126648, filed on Jul. 20, 2021.

FIELD

The disclosure relates to a vehicle, and more particularly to a tilting vehicle and a method for assembling the same.

BACKGROUND

Figure 1:
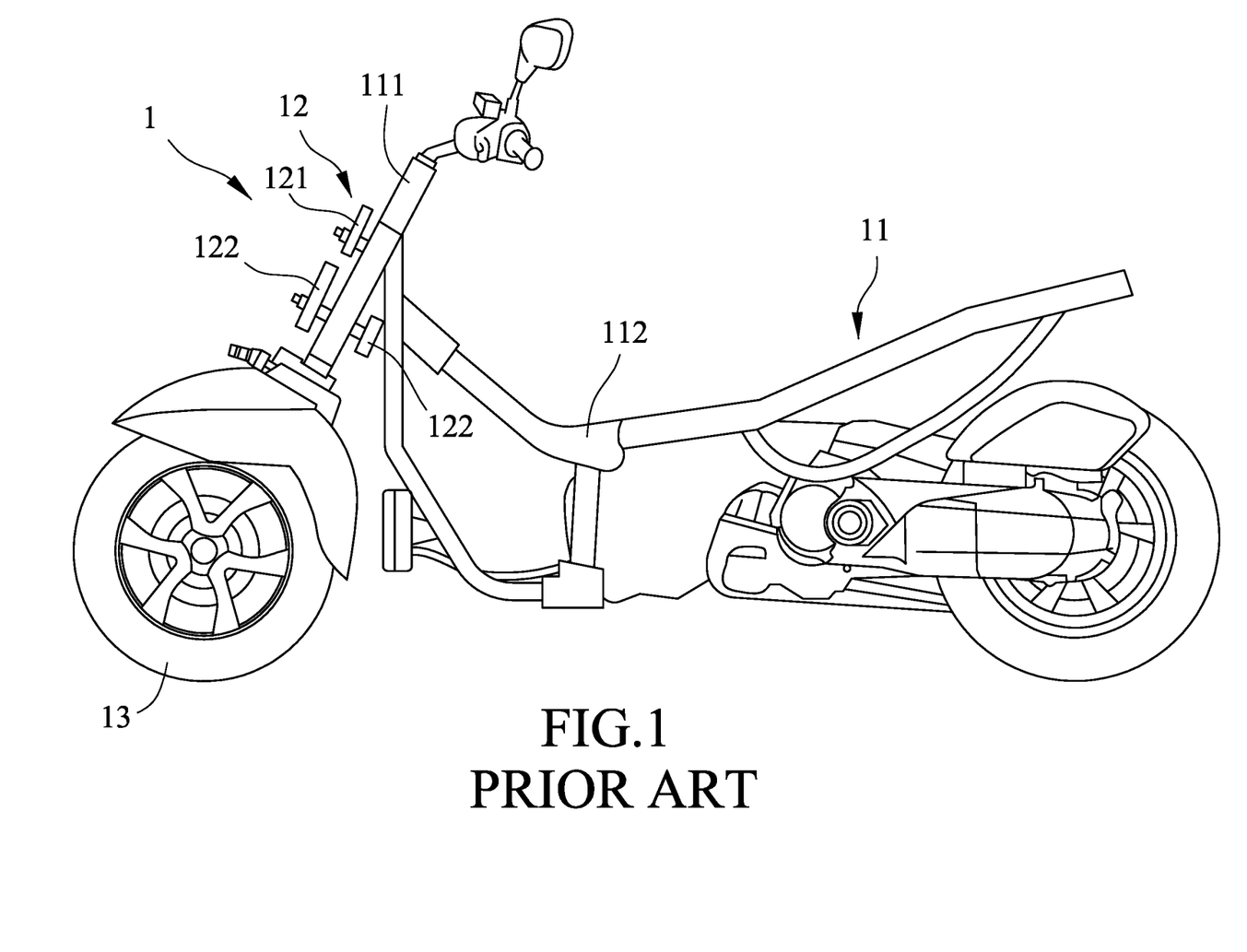
FIG. 1 is a side view illustrating a conventional tilting three-wheeler.
Figure 2:
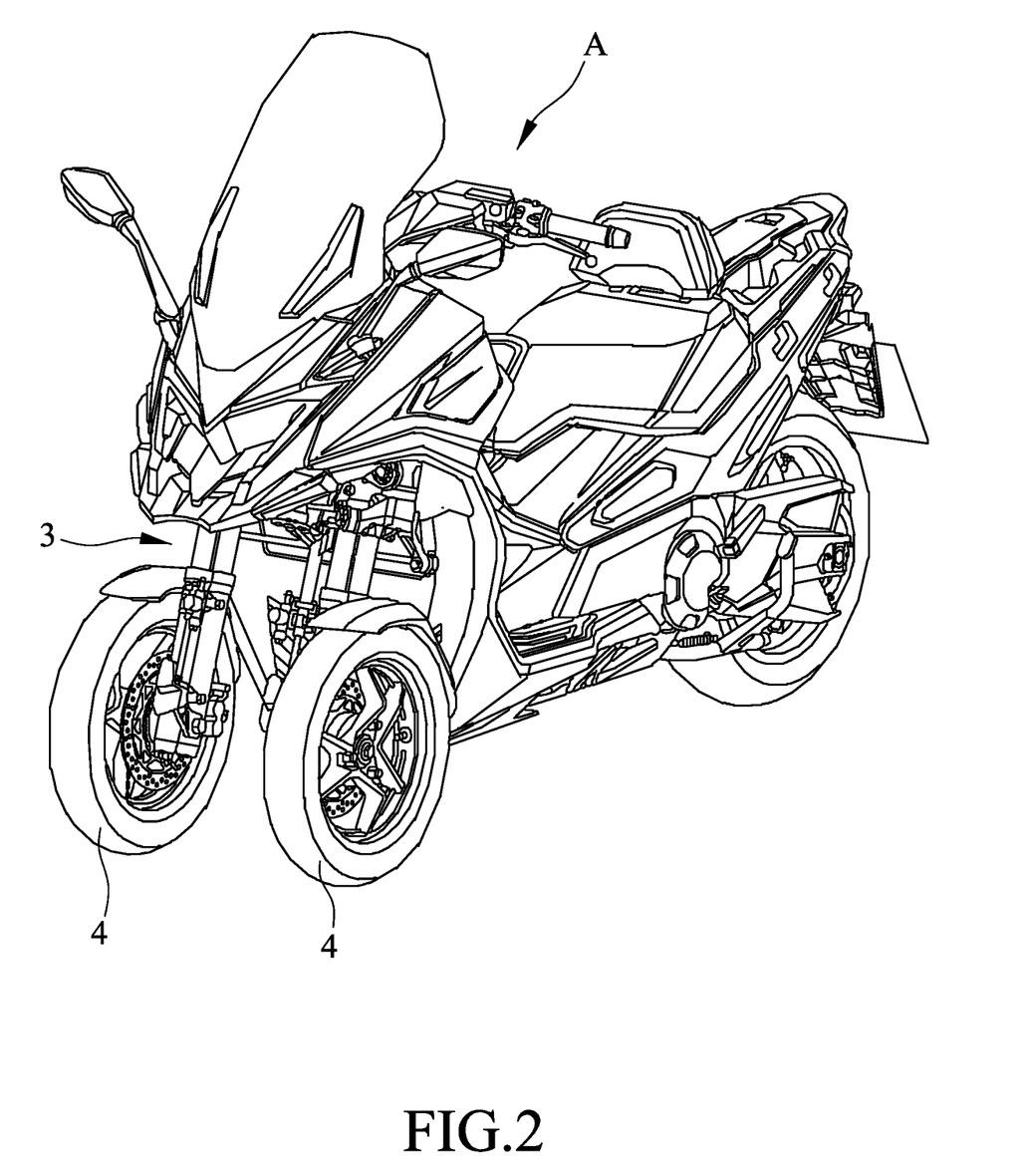
FIG. 2 is a perspective view illustrating an embodiment of a tilting vehicle according to the disclosure.

Referring to FIG. 1, a conventional tilting three-wheeler 1 includes a frame unit 11, a tilting mechanism 12 mounted to the frame unit 11, and two front wheels 13 connected to the tilting mechanism 12 (only one is shown). The frame unit 11 includes a head tube 111 to which the tilting mechanism 12 is mounted, and a main frame 112 disposed behind the head tube 111 and welded to the head tube 111 as one piece. The tilting mechanism 12 includes an upper crossbar 121 disposed in front of the head tube 111, two lower crossbars 122 disposed under the upper crossbar 121 and respectively disposed in front of and behind the head tube 111, and two connecting rods (not shown) spaced apart in a left-right direction, connected respectively to opposite ends of said upper and lower crossbars 121, 122, and configured to be slidable relative to the head tube 111 along an up-down direction. The front wheels 13 are respectively connected to the connecting rods, so that they are movable relative to the head tube 111 along the up-down direction. Since the lower crossbars 122 are respectively disposed in front of and behind the head tube 111, the sliding movement of the connecting bars is stabilized with a strengthened overall structure of the three-wheeler 1.

However, due to a large number of components disposed between the frame unit 11 and the tilting mechanism 12, there is limited space between the head tube 111 and the main frame 112, which often causes inconvenience for maintenance or replacement of components. Furthermore, due to the integrated one-piece design of the head tube 111 and the main frame 112, large fixtures are required for securing during maintenance, which also causes inconvenience and reduces efficiency of the process.

SUMMARY

Therefore, the object of the disclosure is to provide a tilting vehicle and a method for assembling the tilting vehicle that can alleviate the drawback of the prior art.

According to an aspect of the disclosure, a tilting vehicle includes a frame unit, a tilting mechanism and two front wheels.

The frame unit includes a head tube extending generally along an up-down direction, and a main frame detachably connected to the head tube. The tilting mechanism includes at least one crossbar pivotally connected to the head tube and extending along a left-right direction transverse to the up-down direction, and two connecting rods extending along the up-down direction, being opposite to each other along the left-right direction, and being pivotally connected to opposite ends of the at least one crossbar, respectively, such that each of the connecting rods is movable along the up-down direction relative to the head tube. The front wheels are rotatably mounted to the connecting rods, respectively.

According to another aspect of the disclosure, a method for assembling the tilting vehicle includes a front structure assembly step, in which the tilting mechanism is assembled to the head tube of the frame unit, and an intermediate structure assembly step, in which the at least one upper member and the at least one lower member of the head tube are assembled to the upper portion and the lower portion of the main frame, respectively.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Before the present disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 2 to 5, an embodiment of a tilting vehicle (A) according to the disclosure includes a frame unit 2, a tilting mechanism 3 mounted to the frame unit 2, two front wheels 4 rotatably mounted to the tilting mechanism 3, a front suspension unit 5 mounted to the tilting mechanism 3, and a power unit 6 mounted to the frame unit 2. It should be noted that, for the sake of illustration, many components of the tilting vehicle (A), such as rear wheels, handles, and body panels, are omitted in FIGS. 3 to 5. Further, for the sake of description, an up-down direction (L1), a left-right direction (L2) perpendicular to the up-down direction (L1), and a front-rear direction (L3) perpendicular to the left-right direction (L2) are defined hereinafter for describing structure relationships among the components of the embodiment.

The frame unit 2 includes a head tube 21 extending generally along an up-down direction (L1), a main frame 22 disposed behind the head tube 21 along a front-rear direction (L3) and detachably connected to the head tube 21, and a plurality of first set screws 23 that fasten the head tube 21 to the main frame 22. The head tube 21 has a tube body 211, two upper members 212 and two lower members 213. The tube body 211 extends obliquely along the up-down direction (L1) and permits the tilting mechanism 3 to be connected thereto. The upper members 212 are connected to the tube body 211, extend generally in a direction towards the main frame 22, and are opposite to each other along the left-right direction (L2). The lower members 213 (only one is shown in FIG. 3) are connected to the tube body 211, extend generally in a direction towards the main frame 22, are opposite to each other along the left-right direction (L2), and are respectively disposed below the upper members 212 along the up-down direction (L1).

The main frame 22 extends along the front-rear direction (L3), and has a front frame member 221 that is detachably connected to the head tube 21, and a rear frame member 222 that is detachably connected to the front frame member 221 along the front-rear direction (L3). It should be noted that the upper members 212 and the lower members 213 are not limited to the above-mentioned configurations. In variations of the embodiment, the upper members 212 and the lower members 213 may extend in a curved path or obliquely with respect to the direction towards the main frame 22, depending on actual needs.

Figure 3:
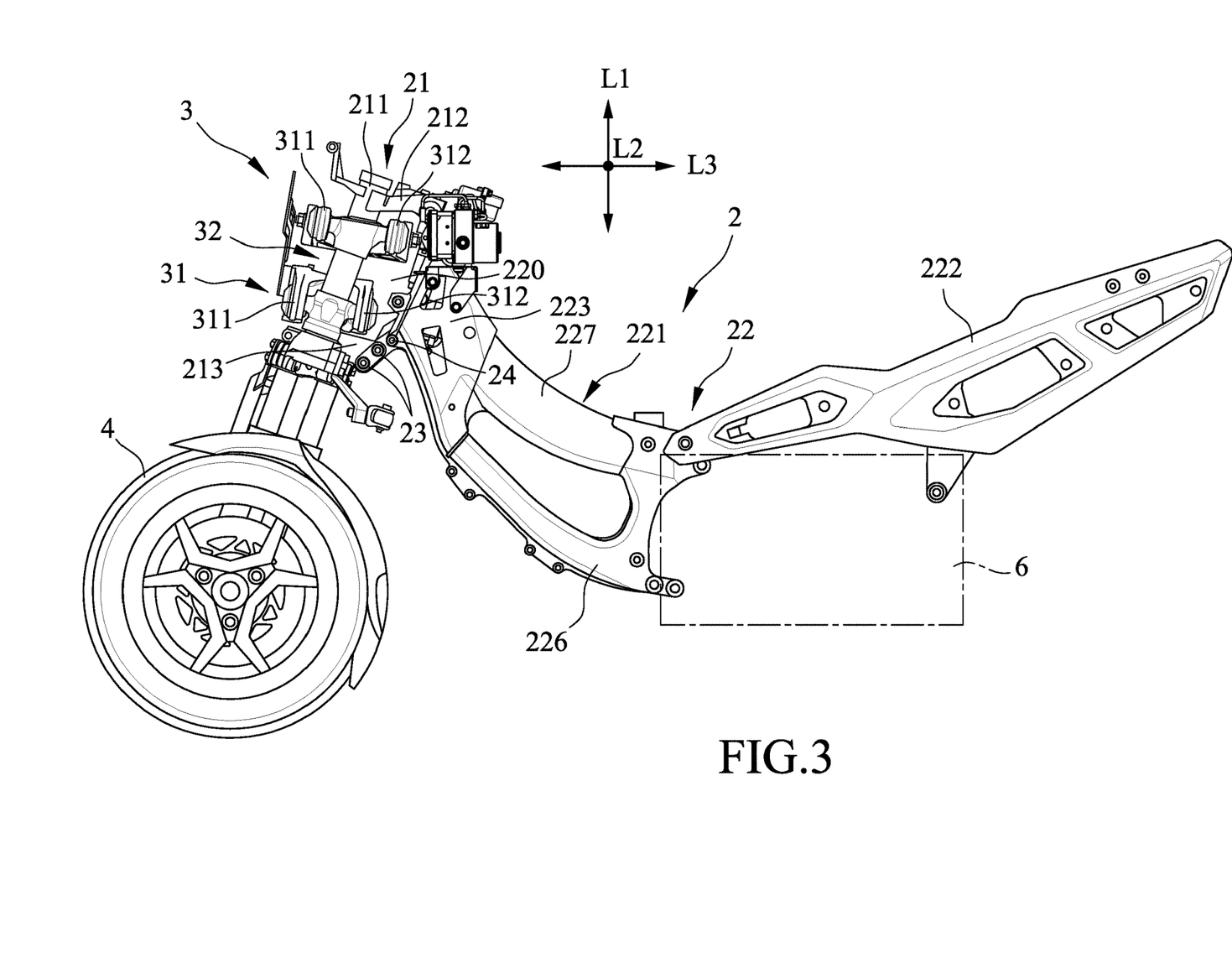
FIG. 3 is a schematic side view illustrating a frame unit and a power unit of the embodiment of the tilting vehicle.
Figure 5:
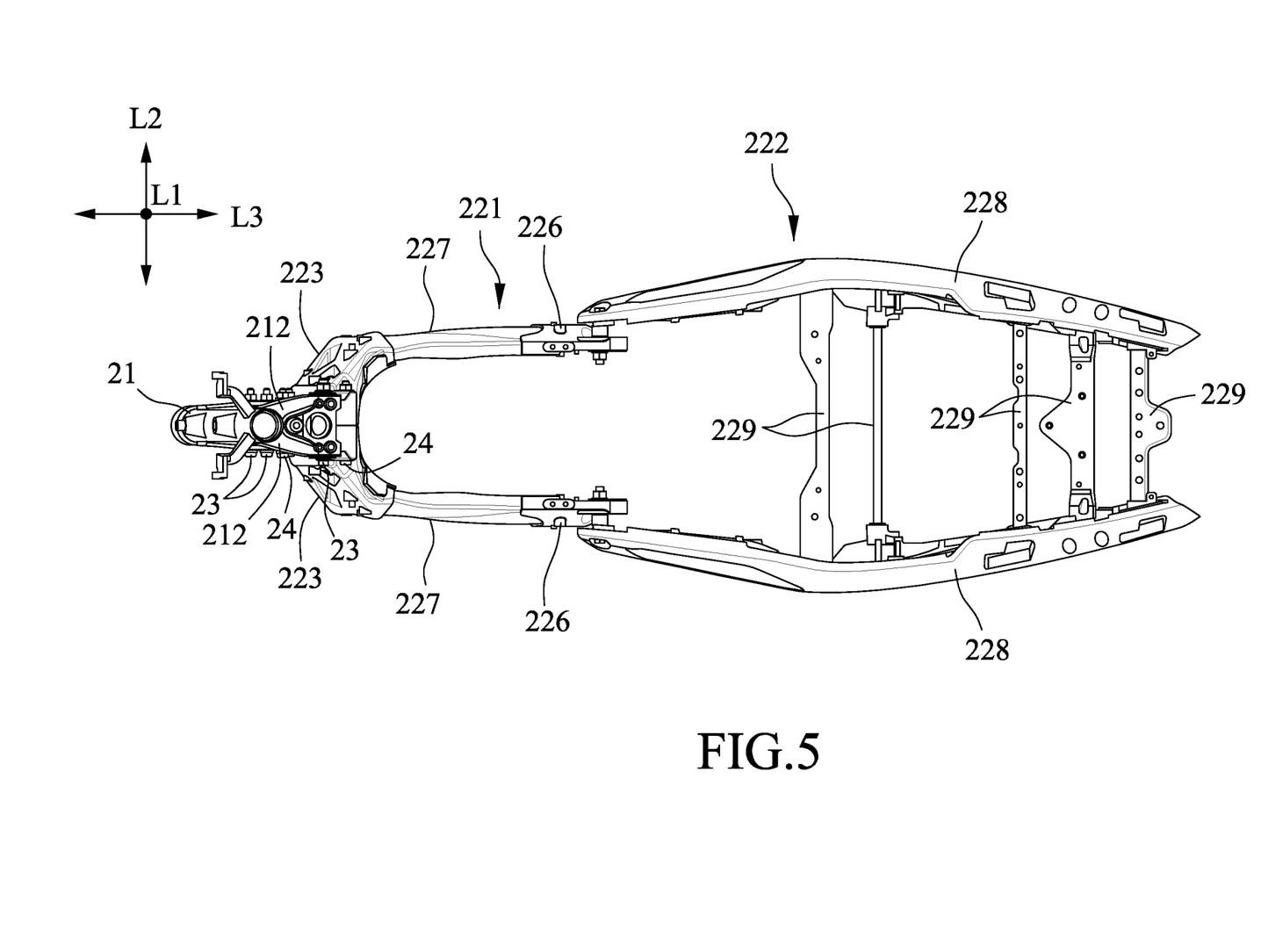
FIG. 5 is a fragmentary top view of the embodiment of the tilting vehicle, illustrating a head tube and a main frame of the frame unit.
Figure 6:
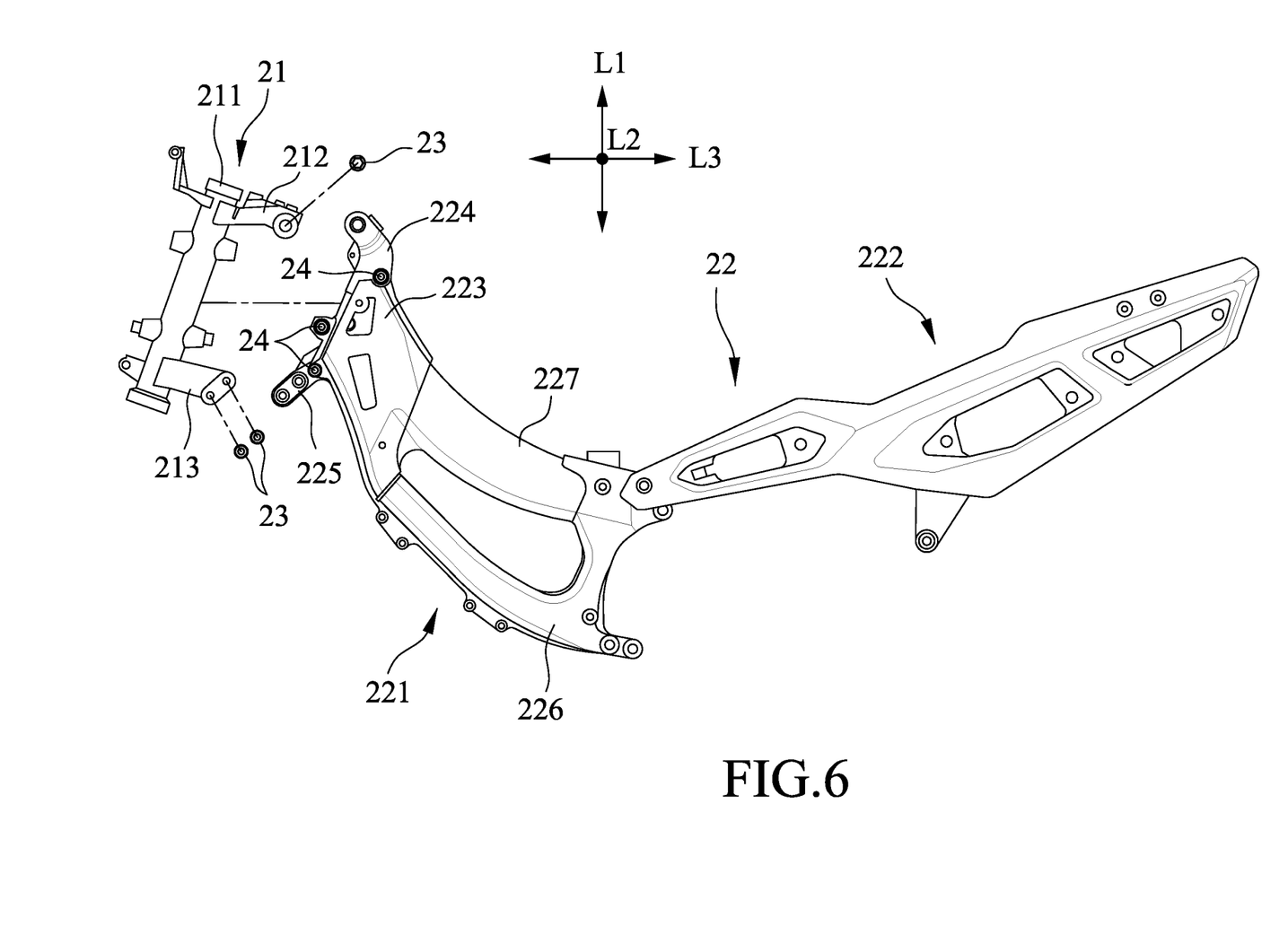
FIG. 6 is an exploded side view illustrating the assembly of the head tube and the main frame.

Referring to FIGS. 3, 5 and 6, the front frame member 221 has two junction portions 223, two upper portions 224, two lower portions 225, two linking portions 226 and two connecting portions 227.

The junction portions 223 are spaced apart from the head tube 21 along the front-rear direction (L3). The upper portions 224 respectively extend from the junction portions 223 generally in a direction towards the upper members 212. The lower portions 225 (only one is shown in FIG. 3) are spaced apart from and disposed below the upper portions 224, and respectively extend from the junction portions 223 generally in a direction towards the lower members 213. The linking portions 226 respectively extend backwards from the junction portions 223 along the front-rear direction (L3), and are spaced apart from each other along the left-right direction (L2). The connecting portions 227 extend backwards from the junction portions 223 along the front-rear direction (L3), and are disposed respectively above the linking portions 226 along the up-down direction (L1).

Specifically, the junction portions 223 are detachably connected to each other along the left-right direction (L2) by means of fastening. The upper portions 224 are connected to each other via the connection of the junction portions 223, and are respectively fastened to the upper members 212 by the first set screws 23. The lower portions 225 are connected to each other via the connection of the junction portions 223, and are respectively fastened to the lower members 213 by the first set screws 23. Each of the linking portions 226 has a front end that is welded to a rear end of a respective one of the junction portions 223, and a rear end that extends upwardly along the up-down direction (L1) and that is detachably connected to the rear frame member 222. Each of the connecting portions 227 has a front end that is welded to the rear end of a respective one of the junction portions 223 and that is disposed directly above the front end of a respective one of the linking portions 226, and a rear end that is welded to the respective one of the linking portions 226. In such a manner, the structural strength between the junction portions 223 and the linking portions 226 is enhanced. Further, the junction portions 223, the upper portions 224, and the lower portions 225 of the main frame 22 cooperate with the head tube 21 to define a movement space 220 thereamong. It should be noted that the upper portions 224 and the lower portions 225 are not limited to the above-mentioned configurations. In variations of the embodiment, the upper portions 224 and the lower portions 225 may extend in a curved path or obliquely with respect to the direction towards the head tube 21, depending on actual needs (a number of components are omitted in FIG. 6 for the sake of illustration).

It should also be noted that, the junction portions 223 are fastened to each other by a plurality of second set screws 24 that extend along the left-right direction (L2), and that are disposed between the upper portions 224 and the lower portions 225 along the up-down direction (L1). As such, dimensions of the junction portions 223 can be minimized, thereby reducing an overall weight of the main frame 22. Furthermore, the second set screws 24 are not aligned with each other along each of the up-down direction (L1) and the front-rear direction (L3), and thus occurrences of stress concentration can be reduced.

The rear frame member 222 has two extending portions 228 and a plurality of support bars 229. The extending portions 228 are spaced apart from each other along the left-right direction (L2), extend along the front-rear direction (L3), and are respectively connected to the linking portions 226 by screws, such that the front frame member 221 is secured to the rear frame member 222. The support bars 229 extend along the left-right direction (L2) and are configured to interconnect the extending portions 228.

Specifically, each of the upper portions 224 is fastened to the respective one of the upper members 212 by one of the first set screws 23 extending along the left-right direction (L2). Each of the lower portions 225 is fastened to the respective one of the lower members 213 by another two of the first set screws 23 extending along the left-right direction (L2).

Figure 4:
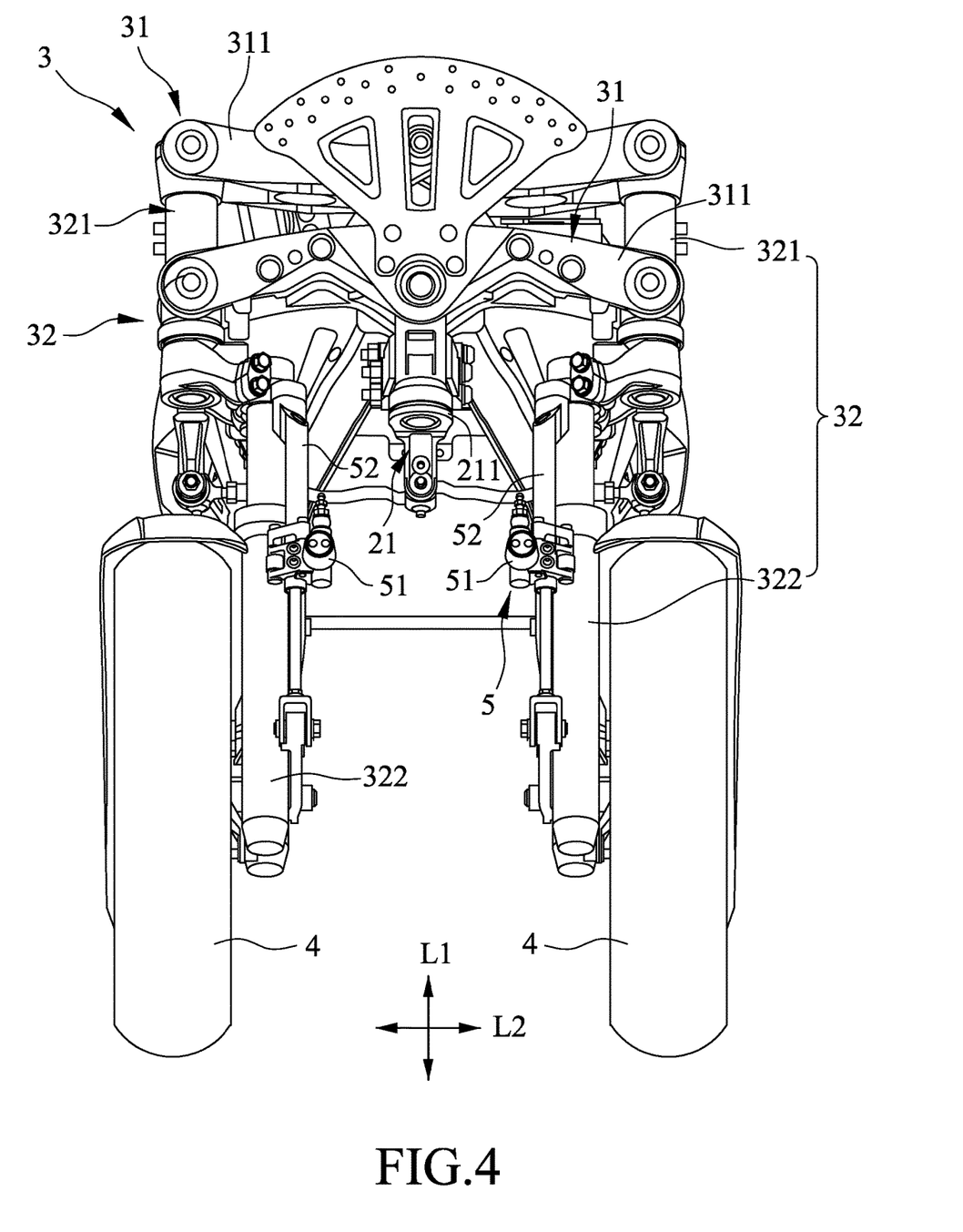
FIG. 4 is a front view illustrating a tilting mechanism, two front wheels, and a front suspension unit of the embodiment of the tilting vehicle.

Referring to FIGS. 3 to 5, the tilting mechanism 3 is mounted to the head tube 21, and includes two crossbars 31 and two connecting rods 32. The crossbars extend partially through the movement space 220 along the left-right direction (L2), are rotatable in the movement space 220, are spaced apart from each other along the up-down direction (L1), and are pivotally connected to the head tube 21. The connecting rods 32 extend along the up-down direction (L1), are opposite to each other along the left-right direction (L2), and are pivotally connected to the crossbars 31.

Specifically, each of the crossbars 31 has a central segment that is pivotally connected to the tube body 211 of the head tube 21, and opposite ends that are opposite to each other along the left-right direction (L2) and that are pivotally connected to the connecting rods 32. More specifically, each of the crossbars 31 includes a front bar portion 311 and a rear bar portion 312 that are opposite to each other along the front-rear direction (L3), that are respectively disposed in front of and behind the tube body 211, and that are pivoted to the tube body 211. The rear bar portion 312 of each of the crossbars 31 is disposed between the upper members 212 and the lower members 213 along the up-down direction (L1), and extends rotatably through the movement space 220. Each of the connecting rods 32 has an upper rod portion 321 that is pivoted between the front bar portion 311 and the rear bar portion 312 of a respective one of the crossbars 31, and a lower connecting rod portion 322 that is connected between the upper rod portion 321 and the front suspension unit 5. By virtue of the above-mentioned connections of the crossbars 31 between the connecting rods 32 and the head tube 21, each of the connecting rods 32 is movable relative to the head tube 21 via the crossbars 31 along the up-down direction (L1). It should be noted that, the number of the crossbars 31 is not limited to two and may be adjusted according to actual needs. For example, in variations of the embodiment, the number of the crossbars 31 may be adjusted to one to occupy less space of the movement space 220, thereby reducing the weight and dimensions of the main frame 22, or the quantity of the crossbar 31 may be adjusted to three or more for enhancing the overall structural strength of the embodiment.

Each of the front wheels 4 is rotatably mounted to a respective one of the connecting rods 32 via the front suspension unit 5, and is configured to be driven by the respective one of the connecting rods 32 to move relative to the head tube 21 along the up-down direction (L1). By virtue of positional changes of the front wheels 4 relative to the head tube 21, tilting of the frame unit 2 can be achieved while the front wheels 4 remain touching the ground.

The front suspension unit 5 is mounted to the tilting mechanism 3, and includes two shock absorbers 51 and two stroke adjustment devices 52. Each of the shock absorbers 51 is connected to a respective one of the front wheels 4 and the lower connecting rod portion 322 of a respective one the connecting rods 32. Each of the stroke adjustment devices 52 is operably mounted to a respective one of the shock absorbers 51, and is used for locking the respective one of the shock absorbers 51. Specifically, each of the shock absorbers 51 extends along the up-down direction (L1), is telescopically movably along the up-down direction (L1), and is used for damping a displacement of the respective one of the front wheels relative to the head tube 21. Each of the stroke adjustment devices 52 is operable for locking and preventing telescopic movement of the respective one of the shock absorbers 51, which in turn affects the displacement of the respective one of the front wheels 4 relative to the head tube 21, and thereby enhances the versatility of the shock absorbers 51.

The power unit 6 is mounted between the front frame member 221 and the rear frame member 222 of the main frame 22, and provides power for operations of the embodiment. The linking portions 226 of the front frame member 221 are respectively connected to opposite sides of a front end of the power unit 6 along the left-right direction (L2), and the rear frame member 222 is connected to a rear end of the power unit 6. In the present embodiment of the tilting vehicle (A), the power unit 6 is an internal combustion engine, but is not limited thereto. In variations of the embodiment, the power unit 6 may be a motor. It should be noted that, the power unit 6 is shown schematically in FIG. 3 by a rectangle in broken lines to represent its installation position and its connection with the frame unit 2, and its actual shape is not limited thereto.

In view of the above-mentioned configurations, when operators need to assemble, disassemble or repair parts of the frame unit 2, the tilting mechanism 3, the front wheel 4 and the front suspension unit 5, it is only necessary to remove the head tube 21 from the main frame 22 to perform the intended operations, without necessity to handle other relatively cumbersome structures, such as the main frame 22 and the power unit 6, during the process, which effectively improves convenience and efficiency of the operations. Furthermore, since the head tube 21 and the main frame 22 are designed to be separable for maintenance, smaller fixtures can be used for securing them during maintenance, which further improves the convenience and efficiency of the operations. Moreover, by virtue of the movement space 220 defined by the upper members 212 and the lower members 213 of the head tube 21 and the upper portions 224 and the lower portions 225 of the main frame 22, the operators are provided with ample space to perform maintenance for the tilting mechanism 3, and thus are able to adopt more diverse approaches with higher applicability.

Figure 7:
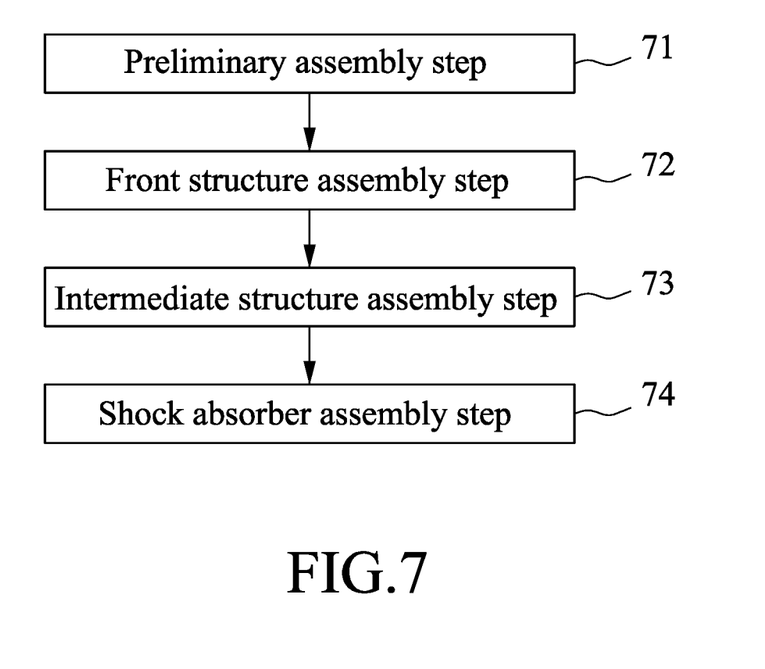
FIG. 7 is a flow chart illustrating an embodiment of a method for assembling the tilting vehicle according to the disclosure.

Referring to FIG. 7, an embodiment of a method for assembling the tilting vehicle (A) according to the disclosure includes a preliminary assembly step 71, a front structure assembly step 72, an intermediate structure assembly step 73, and a shock absorber assembly step 74.

Figure 8:
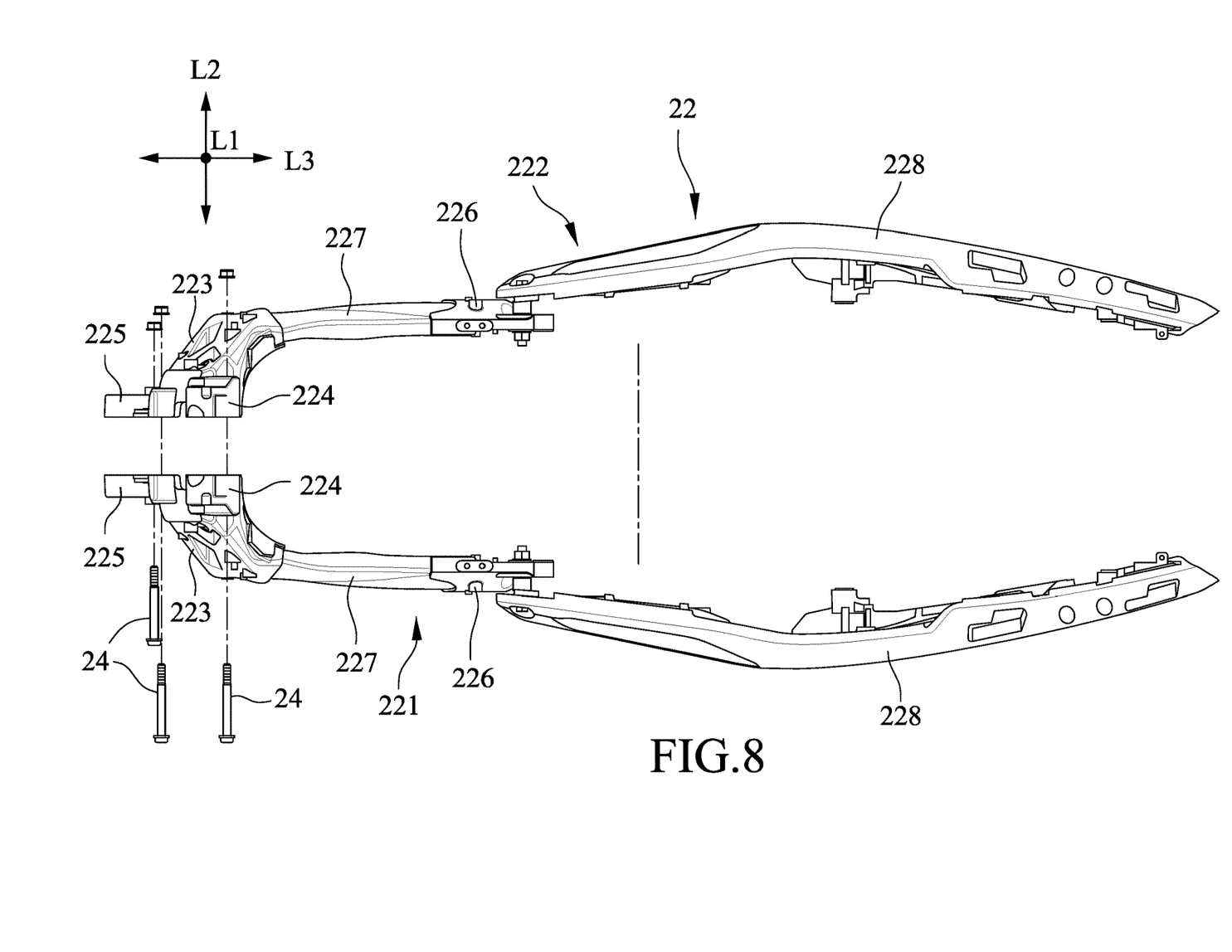
FIG. 8 is an exploded fragmentary top view illustrating the assembly of the main frame.

Referring to FIGS. 7 and 8, in the preliminary assembly step 71, right and left halves of the main frame 22 are connected to each other by means of fastening. Specifically, the junction portions 223 of the main frame 22 are securely fastened together by the second set screws 24, such that the upper portions 224 are brought into contact with each other, and the lower portions 225 (only one is shown in FIG. 3) are also brought into contact with each other. It should be noted that, in variations of the embodiment, the upper portions 224 may also be connected by means of fastening so as to ensure firm connection, and so are the lower portions 225. It should also be noted that, the assembling method for the front frame member 221 and the rear frame member 222 of the main frame 22 is not limited to the present embodiment, which is well known in the art and thus will not be described further hereinafter.

Referring to FIGS. 3 and 7, in the front structure assembly step 72, the tilting mechanism 3 is mounted to the head tube 21 of the frame unit 2 by means of fastening. Specifically, the rear bar portion 312 of each of the crossbars 31 is moved into the movement space 220, and is pivotally connected to the tube body 211 of the head tube 21.

Figure 9:
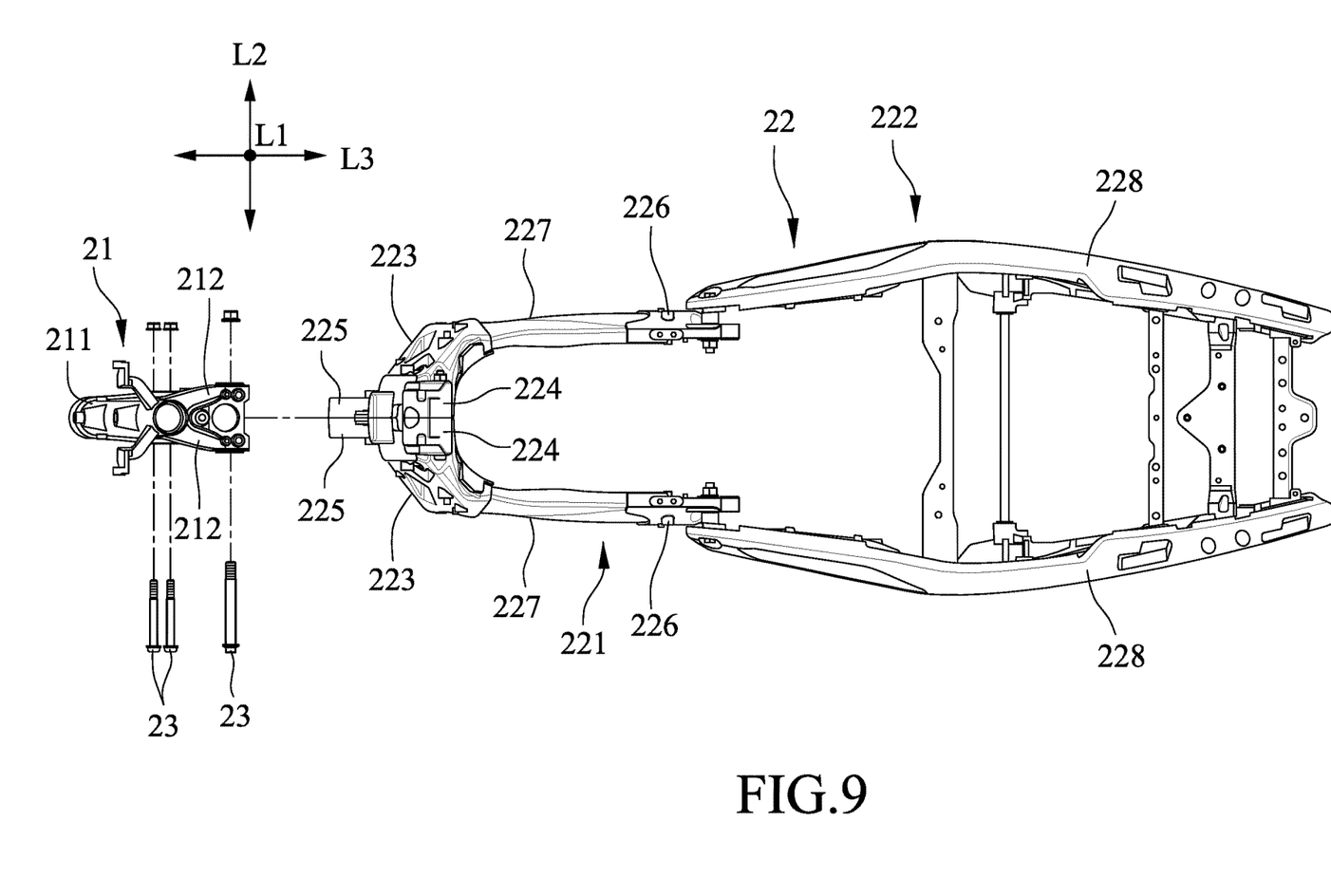
FIG. 9 is an exploded fragmentary top view, to be used in conjunction with FIG. 8 for illustrating the assembly of the head tube and the main frame.

Referring to FIGS. 6, 7 and 9, in the intermediate structure assembly step 73, each of the upper members 212 and the lower members 213 of the head tube 21 is securely fastened to the respective one of the upper portions 224 and the lower portions 225 of the main frame 22 by the first set screws 23. It should be noted that, to proceed to the intermediate structure assembly step 73, the preliminary assembly step 71 should be performed beforehand to complete the assembling of the main frame 22, so that the head tube 21 can be mounted to the main frame 22. In other words, to disassemble the tilting vehicle (A), the head tube can be directly removed from the main frame 22 without disassembling the main frame 22 in advance, which is rather convenient in term of a disassembling process.

Referring to FIGS. 4 and 7, in the shock absorber assembly step 74, the shock absorbers 51 of the front suspension unit 5 are connected to the connecting rods 32 of the tilting mechanism 3, respectively, and each of the front wheels 4 and each of the stroke adjustment devices 52 are mounted to a corresponding one of the shock absorbers 51.

In view of the above, by virtue of the head tube 21, the main frame 22, the tilting mechanism 3 and the front suspension unit 5 being detachable from one another, the diversity of assembly is increased, and the convenience and efficiency of the assembly are improved. It should be noted that, since the main frame 22 is assembled in the preliminary assembly step 71 before the installation of the head tube 21 in the intermediate structure assembly step 73, when maintenance is required, the head tube 21 can be directly removed without dissembling the main frame 22, which is rather convenient.

It should also be noted that, the front structure assembly step 72, the intermediate structure assembly step 73, and the shock absorber assembly step 74 of the embodiment are not limited to the above-mentioned order. In variations of the embodiment, they may be performed in different orders depending on actual requirements. For example, the intermediate structure assembly step 73 may be performed before the front structure assembly step 72, such that the head tube and the main frame 22 are assembled before the tilting mechanism 3 is assembled to the head tube 21. In this case, since the movement space 220 is rather spacious, although the rear bar portions 312 extend therethrough (see FIG. 3), there is still sufficient space for the operators to operate therein with tools for connecting the rear bar portions 312 with the tube body 211.

Furthermore, if the first set screws 23 are fastened along the front-rear direction (L3), a special tool (e.g., an extensible torque bar) is usually required, which often adds difficulties to the operation (e.g., the extensible torque bar may fail to stay in position during assembling). On the other hand, if the first set screws 23 are fastened directly without the extensible torque bar (e.g., with the operators reaching their hands into the vehicle), the operation can be limited by the structure of the vehicle and become cumbersome. Therefore, in the present embodiment, by virtue of the first set screws designed to be fastened along the left-right direction (L2) into the head tube 21 and the main frame 22, the operators can perform operations from the side of the vehicle, with minimal interference from the structure, and without having to bend over and reach into the vehicle or the need of using tools such as the extensible torque bar. Further, occurrences of the first set screws 23 deflecting from their desired fastening position are reduced, resulting in more efficient and stable operations for the assembly.

In addition, the front wheel 4 and the power unit are not limited to be assembled according to the present embodiment, and may be directly assembled to the tilting mechanism 3 and the frame unit 2, respectively, according to actual needs.

In sum, by virtue of the design of the head tube and the main frame 22 of the embodiment of the tilting vehicle (A) being detachable from each other, the disassembly, assembly and maintenance of parts can be easily performed, and the convenience and efficiency of the operations are improved. In addition, by virtue of the movement space 220, the rear bar portions 312 of the tilting mechanism 3 can be easily installed to improve the overall strength, and the operators are provided with ample space to perform maintenance for the tilting mechanism 3. Finally, again, by virtue of the design of the head tube 21 and the main frame 22 being detachable from each other, smaller fixtures can be used for securing them during maintenance, which further improves the convenience and efficiency of the operations.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A tilting vehicle comprising:
   a frame unit that includes a head tube extending generally along an up-down direction, and a main frame detachably connected to said head tube;
   a tilting mechanism that includes at least one crossbar pivotally connected to said head tube and extending along a left-right direction transverse to the up-down direction, and two connecting rods extending along the up-down direction, being opposite to each other along the left-right direction, and being pivotally connected to opposite ends of said at least one crossbar, respectively, such that each of said connecting rods is movable along the up-down direction relative to said head tube; and
   two front wheels that are rotatably mounted to said connecting rods, respectively;
   wherein said main frame extends along a front-rear direction perpendicular to the left-right direction, and has two junction portions that are detachably connected to each other along the left-right direction, and two linking portions that respectively extend backwards from said junction portions along the front-rear direction and that are spaced apart from each other along the left-right direction.

2. The tilting vehicle as claimed in claim 1, wherein:
   said head tube has a tube body that extends generally along the up-down direction and that permits said at least one crossbar to be pivotally connected thereto, two upper members that are connected to said tube body and that are disposed above said at least one crossbar along the up-down direction, and two lower members that are connected to said tube body and that are disposed below said at least one crossbar along the up-down direction, said two upper members and said two lower members extending generally in a direction towards said main frame; and
   said two junction portions are spaced apart from said head tube, said main frame further having two upper portions that respectively extend from said two junction portions generally in a direction towards said upper members, and two lower portions that respectively extend from said two junction portions generally in a direction towards said two lower members, said upper portions and said lower portions being spaced apart from each other, being respectively fastened to said two upper members and said two lower members, and cooperating with said head tube to define a movement space provided for said at least one crossbar to rotate therein.

3. The tilting vehicle as claimed in claim 1, further comprising a power unit that is mounted to said main frame, said main frame having a front frame member, and a rear frame member detachably connected to said front frame member along the front-rear direction, said front frame member having said linking portions that are respectively connected to two sides of a front end of said power unit opposite along the left-right direction, said rear frame member being connected to a rear end of said power unit.

4. The tilting vehicle as claimed in claim 1, wherein said main frame further has two connecting portions extending respectively backwards from said junction portions along the front-rear direction, each of said connecting portions being disposed above a respective one of said linking portions along the up-down direction, and having a rear end that is welded to said respective one of said linking portions, and a front end that is disposed directly above a front end of said respective one of said linking portions, said front end of each of said connecting portions and said front end of said respective one of said linking portions being welded to a rear end of a respective one of said junction portions.

5. The tilting vehicle as claimed in claim 1, further comprising a front suspension unit that is mounted to said tilting mechanism, and that includes two shock absorbers each being connected to a respective one said connecting rods and a respective one of said front wheels, and two stroke adjustment devices being respectively and operably mounted to said shock absorbers.

6. The tilting vehicle as claimed in claim 2, wherein said frame unit further includes a plurality of set screws that fasten said head tube to said main frame, each of said upper portions being fastened to the respective one of said upper members by a corresponding one of said set screws that extends along the left-right direction, each of said lower portions being fastened to the respective one of said lower members by a corresponding one of said set screws that extends along the left-right direction.

* * * * *